United States Patent

[11] 3,575,045

| [72] | Inventor | Richard Northam Knights<br>Gloucester, England |
|---|---|---|
| [21] | Appl. No. | 746,479 |
| [22] | Filed | July 22, 1968 |
| [45] | Patented | Apr. 13, 1971 |
| [73] | Assignee | Amsler (Great Britian) Limited<br>Leamington Spa, England |
| [32] | Priority | Aug. 1, 1967 |
| [33] | | Great Britain |
| [31] | | 35,186/67 |

[54] TESTING MACHINE FOR APPLYING STATIC AND DYNAMIC FORCES
4 Claims, 3 Drawing Figs.

[52] U.S. Cl................................................. 73/92,
73/93, 73/97
[51] Int. Cl...................................................... G01n 3/32,
G01n 3/10
[50] Field of Search.......................................... 73/92, 93,
12, 101, 15.6 (Inquired), 91, 97 (Inquired), 67.3;
92/61, 62, 67, 66, (Inquired); 91/173, 217, 177

[56] References Cited
UNITED STATES PATENTS
3,442,120  5/1969  Russenberger et al........  73/92

FOREIGN PATENTS
949,894  2/1964  Great Britain................

OTHER REFERENCES
" Hydraulic Tension-Compression Fatigue Machine" —R. M. N. Pellowx & S. D. Brooks, Boeing Scientific Lab., Seattle, Wash., publ. in REVIEW OF SCIENTIFIC INSTRUMENTS, Vol. 35, Number 11, Nov. 1964.
" Structural & Materials Testing Systems" — MTS Div., Research, Incorp. Minneapolis, Minn. Jan. 4-1965

Primary Examiner—James J. Gill
Assistant Examiner—M. Smollar
Attorney—Young & Thompson ABSTRACT: A dual-purpose static/dynamic testing machine comprising a base supporting an outer hydraulic double-ended ram cylinder containing a movable piston which is hollow and itself forms the cylinder for a second movable piston connected to a piston rod passing through the upper ends of both cylinders and having means for attachment to a specimen at its upper end. Valve means admit hydraulic pressure selectively to opposite ends of the outer cylinder to apply a static load, and further valve means apply oscillating hydraulic pressure to opposite ends of the inner cylinder for dynamic testing.

INVENTOR
RICHARD NORTHAM KNIGHTS
BY Young + Thompson
ATTORNEYS

Patented April 13, 1971

INVENTOR
RICHARD NORTHAM KNIGHTS
BY Young + Thompson
ATTORNEYS

TESTING MACHINE FOR APPLYING STATIC AND DYNAMIC FORCES

This invention relates to machines for testing specimens or components, usually by applying compressive and/or tensile loads, and it is an object of the invention to provide a testing machine which is capable of applying selectively both static loads and dynamic loads.

It is known to provide in a testing machine both a static load actuator and a dynamic actuator, the static actuator being in the form of a hydraulic ram, usually positioned in the base of the machine and having a comparatively long stroke as is necessary to extend a specimen through the required testing range. A dynamic actuator may be mounted in a crossmember supported from the base by two uprights and supplied with hydraulic fluid under controlled fluctuating pressure. Such arrangements suffer from various disadvantages particularly in heavy duty large size machines for testing large components; such machines may have an overall height of as much as 18 feet or more, and may be required to exert a static load of up to 100 tons and a dynamic load of as much as 60 tons. In such machines the placing of the dynamic actuator at the upper crossarm tends to produce structural resonance in use which results in an increasing offset or moment arm for the applied load and this in turn adds to the undesirable structural resonance. Also it is necessary to provide flexible high pressure conduits and control connections for the dynamic actuator since this actuator together with the crossmember is usually adjustable vertically on the uprights to suit the length of the specimen under test.

The dynamic actuator is normally smaller in size than the static actuator since the required stroke is considerably less, and also the load, but it would not be satisfactory to reverse the positions of the two actuators since the large mass of the static actuator at the top of the machine could lead to uncontrollable resonances. It is equally unsatisfactory to use the main static actuator to apply both the dynamic and static loads since the long column of oil in the static actuator would by its compressibility decrease the efficiency and the frequency response. Also in view of the large volume of oil involved the associated control valve would have to be of very high capacity and this would increase the resolution error of the valve, and tend further to reduce the frequency response.

Accordingly it is an object of the invention to provide an improved testing machine which will overcome at least some of the stated problems and from one aspect the invention consists in a testing machine including two spaced heads adapted to support means for gripping the ends of a specimen or component to be tested, one of the heads being connected to a loading device comprising two fluid operated actuators, one for applying a static load and the other for applying dynamic loads, the two actuators being arranged one inside the other.

From another aspect the invention consists in a testing machine including two spaced heads adapted to support means for gripping the ends of a specimen or component to be tested, one of the heads being connected to a loading device comprising a fluid operated static load actuator having a relatively long stroke, and connected in series therewith a fluid operated dynamic load actuator of relatively short stroke.

From yet another aspect the invention consists in a testing machine including two spaced heads adapted to engage means for gripping the ends of a specimen or component to be tested, one of the heads being connected to a loading device comprising a first fluid operated piston and cylinder assembly, the piston of which itself constitutes or is connected to the cylinder of a second piston and cylinder assembly.

Conveniently the outer cylinder is provided with ports cooperating with ports in the inner cylinder to admit fluid under pressure to the inner cylinder.

Preferably the outer cylinder constitutes a static load actuator and the testing machine includes means for supplying fluid under pressure selectively to opposite ends thereof.

In any case the machine will preferably include a fluid supply for delivering fluid at a fluctuating or alternating pressure to the dynamic actuator, and a feed back control system derived from a load or position sensor associated with one of the heads. The position sensor may be arranged to be operative in two positions at the respective ends of the stroke of the static actuator.

The invention may be performed in various ways and one specific embodiment will now be described by way of example, with reference to the accompanying drawings, in which.

In this example the invention is applied to a heavy duty universal testing machine designed to apply to large components either static or dynamic loads. The overall height of the machine is 18 feet or more and the machine is capable of applying a static load in either compression or tension of up to 100 tons, or a dynamic oscillating load of up to ± 60 tons. In static load tests, the strain or extension of the specimen may be quite considerable and the static load actuator is accordingly designed to afford a total stroke under load of some 9 inches. The dynamic actuator by comparison has a stroke of approximately 1 inch on either side of a center position.

The main elements of the machine are known and will not be described in detail. The machine comprises a base designed to be rigidly mounted on the floor, and upstanding from the base two vertical parallel spaced screw-threaded columns. At their upper ends these columns support a crossmember which is provided with rotary screw-threaded nuts engaging the columns, and driving mechanism for rotating the two nuts in unison so as to raise and lower the crossmember in accordance with the total height of any individual specimen. The crossmember also carries a head 10 (see FIG. 3) designed to engage a clamping device for gripping the upper end of a specimen 11 to be tested.

Figure 1:
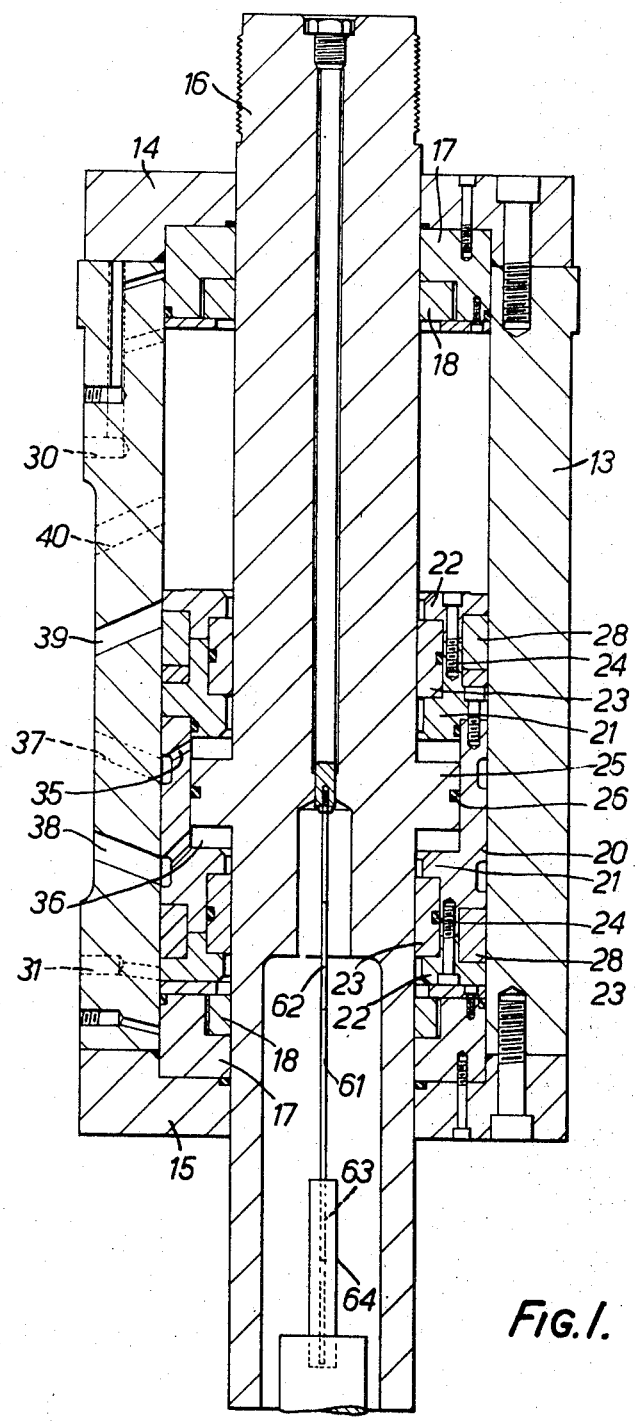
FIG. 1 is a vertical section through a hydraulic actuator according to the invention, to be mounted in the base of a universal testing machine.

Centrally mounted in the base of the machine is a compound dual purpose hydraulic actuator as shown in FIG. 1, having at its upper end a second head 12 for gripping the lower end of the specimen. This actuator includes a main outer cylinder 13, having upper and lower end walls 14, 15 with central apertures through which passes a vertical operating shaft 16 connected at its upper end to the lower head 12 of the machine. The upper and lower end walls 14, 15 are also provided with guide and sealing means for the shaft, comprising a bearing ring 17, and a metallic sealing ring 18. Fluid passages (not shown) are also provided for admitting hydraulic fluid under pressure to the internal surface of the bearing or guide ring 17, and to the external surface of the sealing ring 18, and further relief passages communicate with leakage collection grooves in these two parts.

Within the main cylinder 13 and surrounding the operating shaft 16 is provided an inner cylinder assembly comprising a cylindrical sleeve 20 which is a close sliding fit against the internal surface of the outer cylinder 13. A pair of ring members 21, 22 is rigidly bolted to the upper and lower ends of this sliding sleeve 20 and projecting somewhat inwards towards the vertical axis of the operating shaft 16. Each of these pairs of ring members loosely engages and locates a ring-shaped shaft seal 23 which is a close sliding fit on the external surface of the operating shaft. Each of these shaft seals 23 is formed in its internal surface with multiple fine circumferential grooves designed to balance the hydraulic pressure around the periphery of the shaft and preventing locking. Each shaft seal is free to move within limits in relation to the remaining parts of the inner cylinder assembly and is hydraulically sealed thereto by means of an O-ring seal 24. From a midpoint in each shaft seal a hydraulic vent passage may lead through the adjacent parts of the inner cylinder assembly to a port lying adjacent the inner surface of the main outer cylinder.

The inner cylinder assembly as described defines an annular space surrounding the operating shaft 16 and the shaft is formed with an integral flange or piston 25 within this annular space but of smaller vertical dimensions so that the flange is free to move approximately 1 inch in either direction from a central position as shown in FIG. 1. The outer cylinder surface of this flange 25 is provided with a bronze sealing ring 26 engaging the inner cylindrical surface of the sliding sleeve component 20 of the inner cylinder assembly.

Each pair of ring members 21, 22, also provides an external annular groove or recess, in which is loosely located a further ring-shaped external bearing element 28 engaging the internal surface of the outer cylinder 13.

Main "static" hydraulic pressure connections 30, 31, are provided through the wall of the cylinder 13 for admitting hydraulic fluid under pressure selectively to the top or bottom ends of the main cylinder, to apply a static load. The two connections 30, 31, are connected to a high pressure hydraulic supply and to relief, selectively, through a change over and control valve which is of known design, and is therefore not illustrated. Assuming that pressure fluid is admitted to the lower end of the main cylinder via connection 31, the upper connection 30 being connected to relief, the inner cylinder assembly will be forced upwardly until the lower ring component 21 of this assembly engages the integral flange 25 on the operating shaft. The thrust exerted by the pressure fluid will then be transferred to the operating shaft which will be moved upwards to apply the desired static compressive load to the specimen 11 under test. Similarly by supplying pressure fluid to the upper end of the main cylinder via connection 30 a static tensile load of the required value can be applied.

In order to apply a dynamic load to a specimen the inner cylinder assembly is first moved to the upper or lower end of the main cylinder, by supplying pressure fluid to the appropriate end of the main cylinder via connections 30 or 31 as described above. When the inner cylinder assembly reaches one end of the main cylinder (e.g. the lower end as shown in FIG. 1) it is halted by engagement with the parts 17, 18 carried by the respective end wall 15 and held in this position by the pressure of the hydraulic fluid in the main cylinder 13, which as stated may exert a force of up to 100 tons. In this position two horizontal ports 35, 36 through the sliding sleeve 20 of the inner cylinder assembly are aligned with corresponding ports 37, 38 through the cylindrical wall of the main outer cylinder 13, these two ports being connected to an alternating oil supply system which will be described below. Hydraulic fluid under pressure is supplied by this system through the two ports 35, 36 to create pressure reversal at the desired frequency within the two ends of the inner cylinder assembly, that is to say above and below the integral flange 25 of the operating shaft. The desired dynamic load is thus applied to the operating shaft 16 and hence to the specimen under test.

In the conditions referred to above the pressure within the inner cylinder assembly exerts an outward bursting force on the sliding sleeve 20 and tends to lock this sleeve in contact with the main outer cylinder 13, thus acting to reduce hydraulic leakage. The two shaft seals 23 at the upper and lower ends of the inner cylinder assembly are designed to allow free movement of the operating shaft 16 but in consequence it may be expected that there will be some leakage around the shaft. In the case of the upper shaft seal 23 this is of no serious consequence when the inner cylinder is at the top of its stroke and in the case of the lower shaft seal any fluid passing in either direction along the shaft will escape through a relief passage to a vent port in the main outer cylinder which is aligned with this passage when the inner cylinder assembly is in this upper limiting position.

The machine can also be used to apply a dynamic load in exactly the same manner with the inner cylinder assembly at the upper end of the main cylinder, and for this purpose two further fluid ports 39, 40, equivalent to ports 37, 38, are provided through the main cylinder wall at the upper end thereof.

Figures 2, 3:
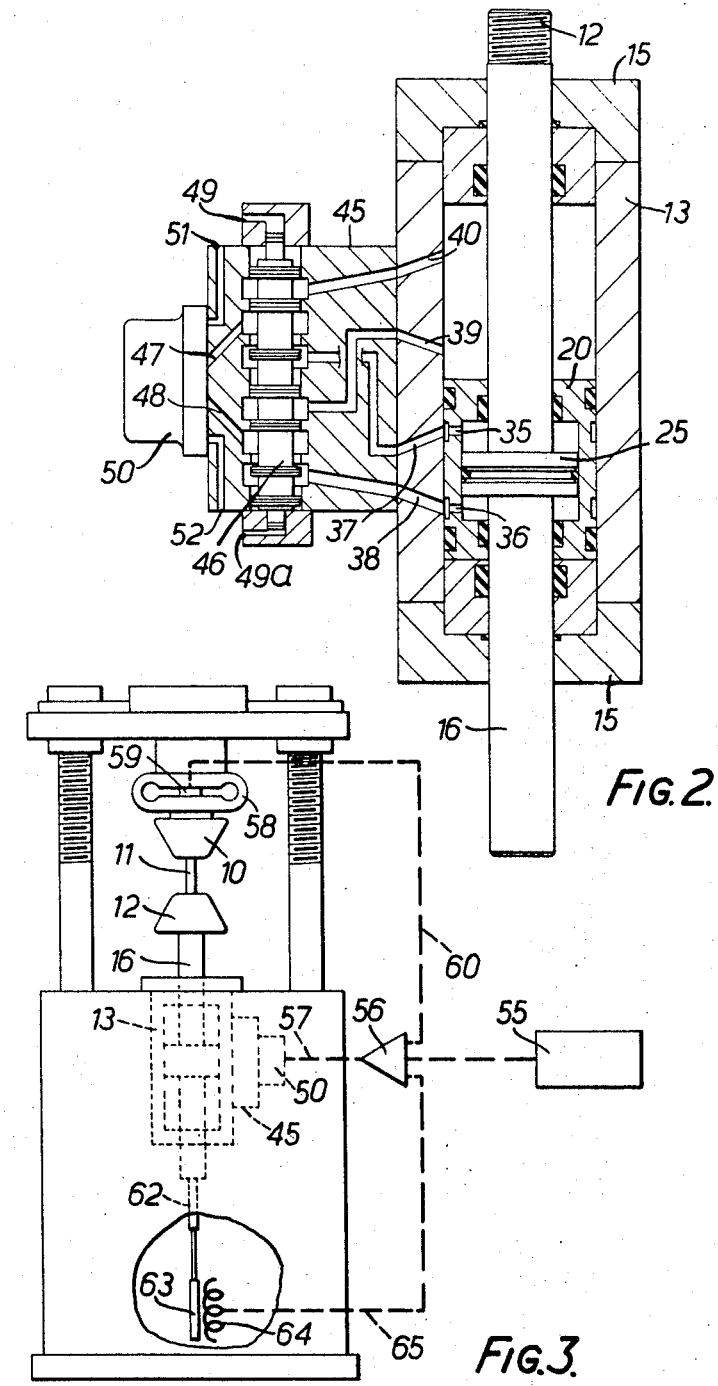
FIG. 2 is a diagrammatic section through the actuator and the associated four-way changeover valve.
FIG. 3 is a circuit diagram illustrating the electrohydraulic control circuit of the actuator.

The fluid pressure supply system for supplying the alternating pressure fluid for the dynamic actuator is illustrated in FIGS. 2 and 3. FIG. 2 illustrates diagrammatically the main components of the hydraulic actuator within the main cylinder 13, and shows the associated four-way changeover valve 45 for the dynamic actuator. Parts corresponding to parts shown in FIG. 1 are indicated by the same reference numerals. The valve 45 includes a valve housing providing a bore containing a valve spindle 46 with multiple lands, arranged to connect two input pressure lines 47, 48 selectively either to the lower pair of connections 37, 38, or to the upper pair 39, 40 depending upon whether the inner cylinder assembly is at the bottom or top of the main cylinder. The inoperative pair of ports are closed by the valve. The valve spindle 46 is shifted between its operative positions by applying hydraulic fluid as required through one of two pilot passages 49, 49a at the ends of the valve housing.

The hydraulic pressure existing at the input pressure lines 47, 48, is controlled, as to frequency and amplitude, by an electrohydraulic high speed servo valve 50, connected between the lines 47, 48, and a main constant pressure supply line 51, and a relief line 52. The electrical control system for the valve 50 is illustrated in FIG. 3 and comprises a variable frequency electronic oscillator 55 coupled to an amplifier 56 for producing an oscillating electrical control signal on line 57 of the required frequency and amplitude. This output signal is applied to the electrically-operated hydraulic reversing servovalve 50, arranged to produce an alternating hydraulic supply of the desired amplitude in the two input pressure lines 47, 48. The circuit also includes a variable feedback circuit for the amplifier, depending upon either the load exerted on the specimen or upon the position of the operating shaft, or both. To sense a load exerted on the specimen it is convenient to provide a ring-type strain gauge 58 at the upper head and to connect the transducer 59 of this gauge via a feedback circuit 60 into the electronic amplifier 56, the arrangement being such that the amplifier will automatically adjust the amplitude of the alternating pressure pulses to produce the required load. To provide control of the alternating pressure system from the position of the operating shaft 16, a member 61 is attached to the shaft 16 within its hollow interior (see FIG. 1) and carries two spaced magnetic armatures 62, 63, capable of moving within a stationary pickup coil 64 so as to vary the reactance of the coil in accordance with the vertical position of the shaft. This change in reactance is caused to act through an electrical feedback circuit 65 to adjust the output of the amplifier 56 accordingly. Since, as explained, the shaft 16 may be at either the top or bottom of its full stroke when the dynamic actuator is energized, the two ferromagnetic armatures 62, 63 are appropriately spaced-apart so that one or other is appropriately aligned with the pickup coil 64 at the two limiting positions of the operating shaft.

I claim:

1. A testing machine including two spaced heads, means on each head for gripping the respective end of a specimen or component to be tested, and a fluid-operated loading device connected to one of said heads, said loading device comprising a first piston and cylinder assembly for applying a static load to the specimen or component, and a second piston and cylinder assembly for applying a dynamic load to the specimen or component, the piston of said first piston and cylinder assembly being hollow and forming the cylinder of said second piston and cylinder assembly, the piston of said second piston and cylinder assembly being connected to said one of said heads by a shaft passing in a fluid-tight manner through the respective ends of the cylinder of both said assemblies, means for admitting fluid under pressure into one end of the cylinder of said first piston and cylinder assembly allowing fluid pressure to be applied to an end of said hollow piston, for applying said static load, a pair of fluid passages passing through the wall of the cylinder of said first piston and cylinder assembly, and a pair of fluid inlets passing through the wall of said hollow piston and so disposed that one of said inlets is always on one side of the piston of said second piston and cylinder assembly and the other said inlet is always on the other side of said piston, said pair of fluid inlets being arranged so as to cooperate with said pair of fluid passages in the wall of said first cylinder when said hollow piston is in an opposite end position, and from said one end in said cylinder, whereby pressure fluid can be supplied to the interior of the hollow piston on both sides of the piston of said second piston and cylinder assembly, for applying said dynamic load.

2. A testing machine as claimed in claim 1, wherein said means for admitting fluid pressure comprise fluid ports located one at each end of the cylinder of said first piston and cylinder assembly, whereby fluid pressure can be applied selectively to either end of said hollow piston for applying said static load in compression or in tension.

3. A testing machine as claimed in claim 1, wherein there are two pairs of said fluid passages, one pair adjacent each end of the cylinder of said first piston and cylinder assembly, each pair being so disposed as to cooperate with said pair of fluid inlets when said hollow piston is in a respective end position in said cylinder, said machine further including a fluid supply system for delivering fluid at a fluctuating or alternating pressure through said fluid passages and fluid inlets to the interior of the hollow piston on both sides of the piston of said second piston and cylinder assembly, and a feedback control system including a position sensor associated with one of the heads, said position sensor being arranged to be operative in two positions at the respective ends of the stroke of said hollow piston.

4. A testing machine including two spaced heads, means on each head for gripping the respective ends of a specimen or component to be tested, and a fluid-operated loading device connected to one of said heads, said loading device comprising an outer hollow closed ended cylinder, an inner hollow closed ended cylinder movable axially within said outer cylinder in a fluid-tight relationship, and a piston having opposed ends, movable axially within the inner cylinder and connected to said one of said heads by a shaft passing in a fluid-tight manner through the respective ends of said inner and outer cylinders, said outer cylinder ends acting as the maximum reaches for said inner cylinder, a fluid port located at one end of said outer cylinder and a second fluid port located at the other end of said outer cylinder, said fluid ports allowing fluid pressure to be applied to either end of said inner cylinder, thereby enabling the inner cylinder to move with said outer cylinder, two pairs of fluid passages passing through the wall of said outer cylinder, said pairs being disposed adjacent opposite ends of said outer cylinder, a pair of fluid inlets passing through the wall of said inner cylinder and disposed so that one of said inlets is always on one side of said piston and the other said inlet is always on the other side of said piston, said pair of fluid inlets being so arranged as to mate with either of said pairs of fluid passages when said inner cylinder is extended to either of its said maximum reaches within said outer cylinder, and an electrohydraulic reversing valve adapted to control the supply of fluid pressure through said pairs of passages whereby dynamically varying pressure loads can be applied to the opposite ends of said piston.